US012339068B1

(12) United States Patent
Reid et al.

(10) Patent No.: US 12,339,068 B1
(45) Date of Patent: Jun. 24, 2025

(54) HEAT PIPE WICK FORMATION

(71) Applicant: Triad National Security, LLC, Los Alamos, NM (US)

(72) Inventors: Robert Stowers Reid, Santa Fe, NM (US); Morgan T. Biel, Los Alamos, NM (US); Lindsey M. Gaspar, Santa Fe, NM (US); Kirk Weisbrod, Los Alamos, NM (US); Katrina M. Sweetland, Los Alamos, NM (US); Robert A. Zimmerman, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 18/654,487

(22) Filed: May 3, 2024

Related U.S. Application Data

(63) Continuation of application No. 17/216,398, filed on Mar. 29, 2021, now Pat. No. 12,007,171.

(60) Provisional application No. 63/003,155, filed on Mar. 31, 2020.

(51) Int. Cl.
*F28D 15/04* (2006.01)
*B23K 31/02* (2006.01)
*B23P 15/26* (2006.01)

(52) U.S. Cl.
CPC .......... *F28D 15/046* (2013.01); *B23K 31/027* (2013.01); *B23P 15/26* (2013.01); *B23P 2700/09* (2013.01); *F28F 2275/061* (2013.01)

(58) Field of Classification Search
CPC ..... F28D 15/046; B23K 31/027; B23P 15/26; B23P 2700/09; F28F 2275/061
See application file for complete search history.

(56) References Cited

U.S. PATENT DOCUMENTS

| 3,681,843 | A | * | 8/1972 | Arcella | B21C 37/151 |
| | | | | | 29/890.032 |
| 3,786,861 | A | * | 1/1974 | Eggers | F28D 15/046 |
| | | | | | 165/104.26 |
| 4,311,733 | A | * | 1/1982 | Inoue | C23C 18/1648 |
| | | | | | 427/230 |
| 4,984,855 | A | * | 1/1991 | Horiuti | C23C 18/36 |
| | | | | | 148/253 |
| 2012/0189839 | A1 | * | 7/2012 | Aoki | F28D 15/046 |
| | | | | | 428/323 |

(Continued)

*Primary Examiner* — Sarang Afzali
*Assistant Examiner* — Darrell C Ford
(74) *Attorney, Agent, or Firm* — Alston & Bird LLP

(57) ABSTRACT

A method for forming an annular heat pipe wick in a controlled atmosphere includes wrapping a plurality of layers of a fine mesh screen around a mandrel to form a wick. The method also includes inserting the mandrel and the wick into a sheath, and compressing the wick between the sheath and the mandrel to form an assembly. The compressing of the wick comprises applying pressure to an exterior of the mandrel and the sheath. The method further includes diffusion bonding the assembly at a temperature sufficiently high achieving self-diffusion of the plurality of layers of the fine mesh screen used to form the wick to themselves. The method also includes cooling the diffusion bonded assembly to room temperature, and etching the mandrel and sheath from the diffusion bonded assembly, leaving the wick as a porous tube.

19 Claims, 10 Drawing Sheets

(56) References Cited

U.S. PATENT DOCUMENTS

| | | | |
|---|---|---|---|
| 2012/0279068 A1* | 11/2012 | Mahefkey | F28D 15/046 |
| | | | 29/890.032 |
| 2018/0180360 A1* | 6/2018 | Katoh | H01L 23/427 |
| 2020/0033068 A1* | 1/2020 | Endoh | H05K 7/20336 |
| 2023/0226587 A1* | 7/2023 | Lojek, III | B21C 1/22 |
| | | | 72/61 |

* cited by examiner

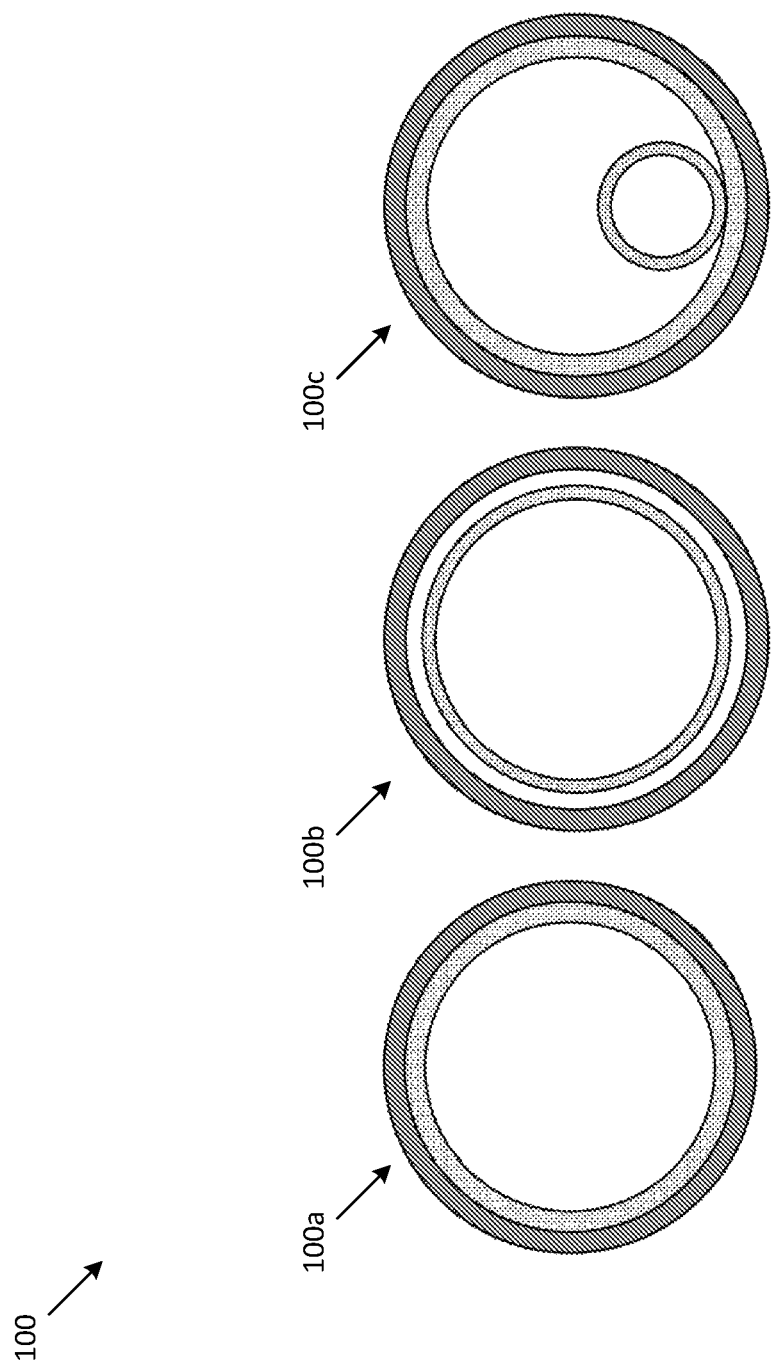

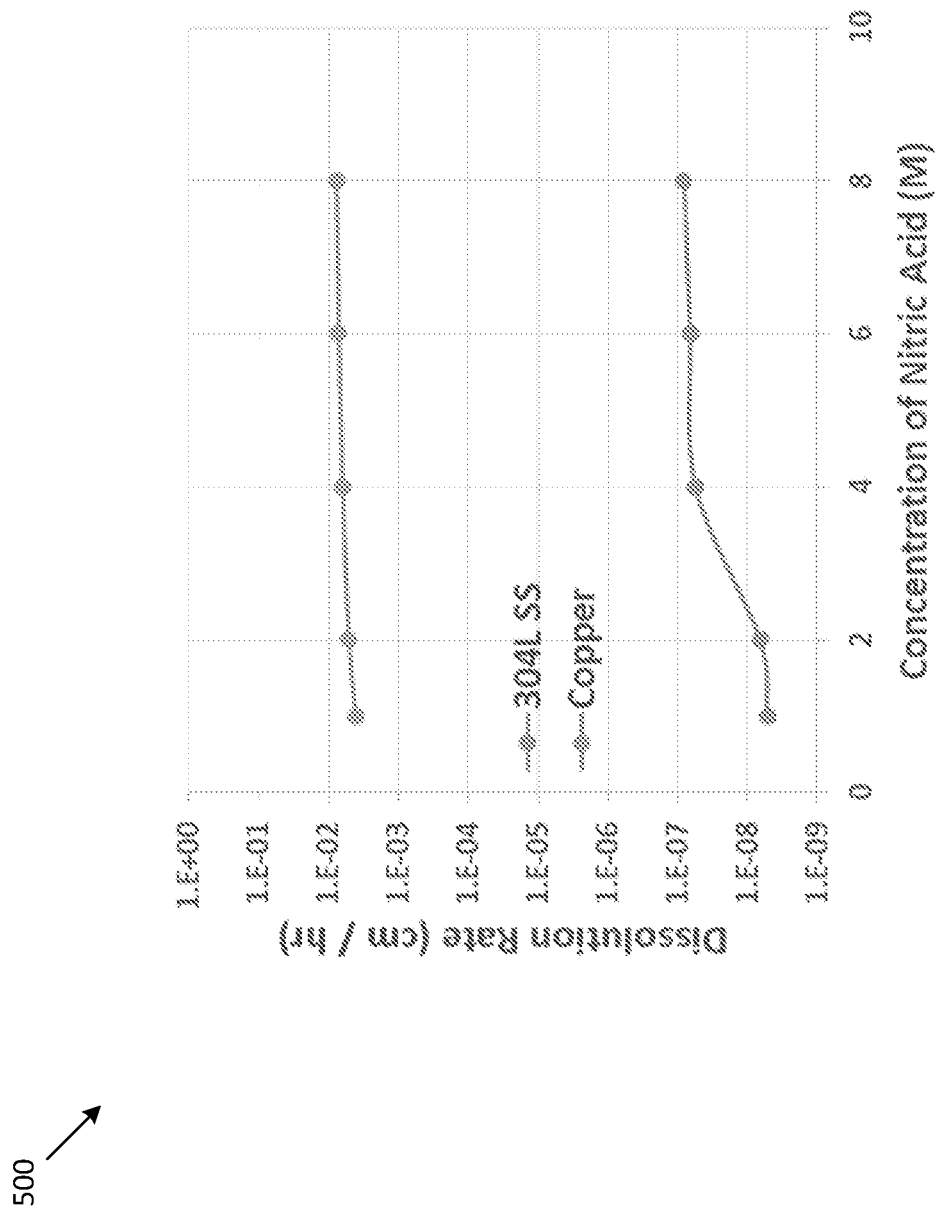

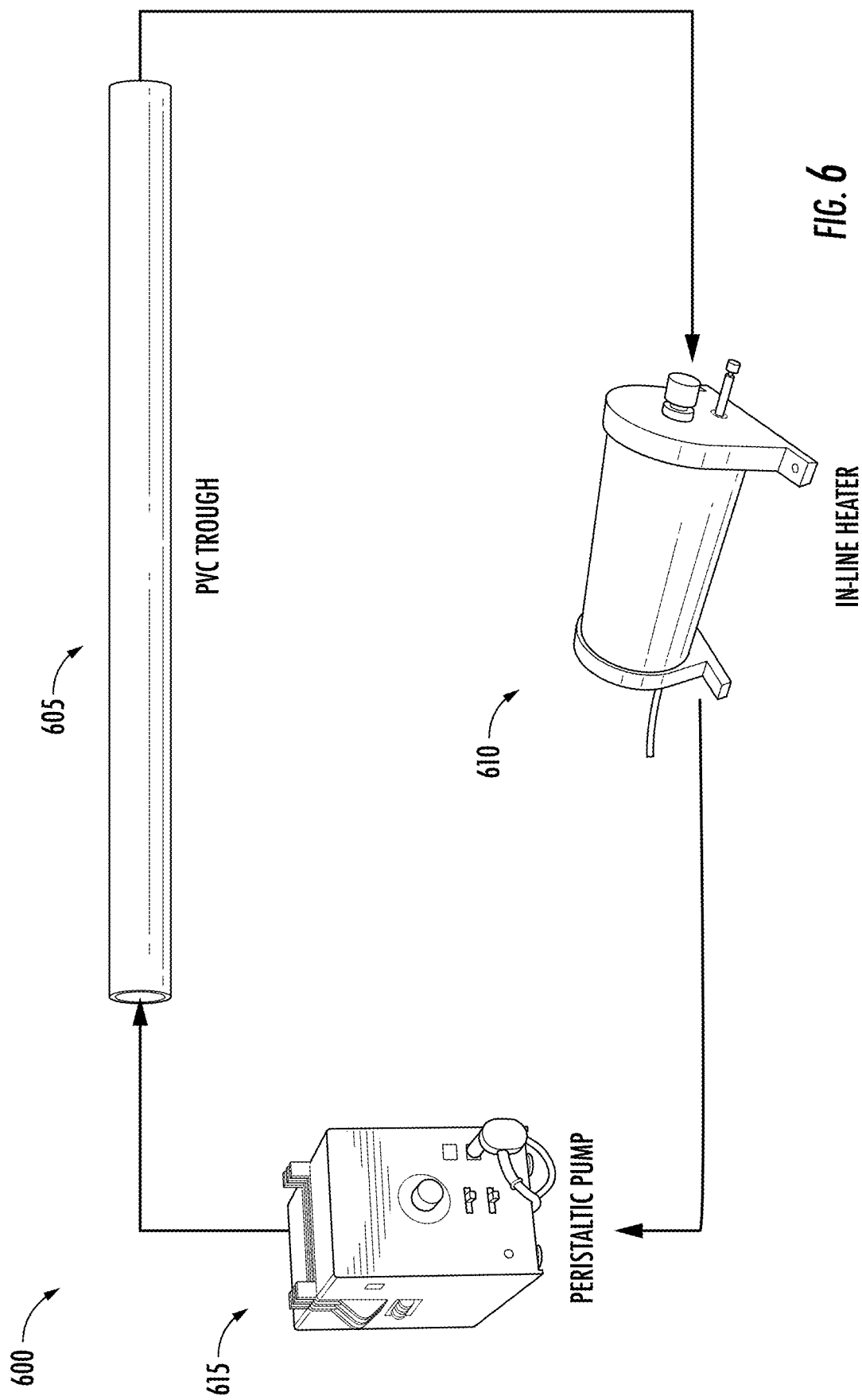

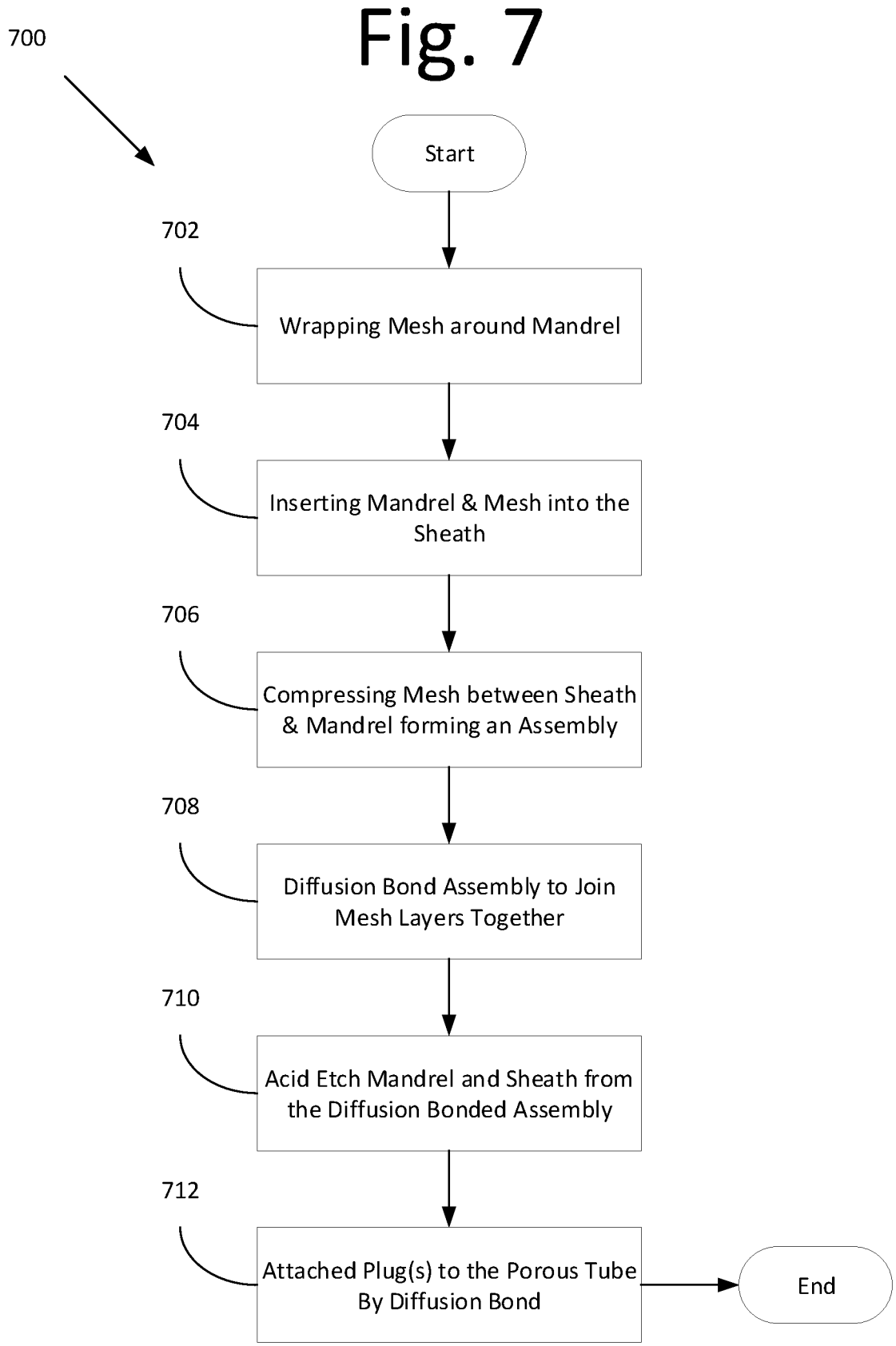

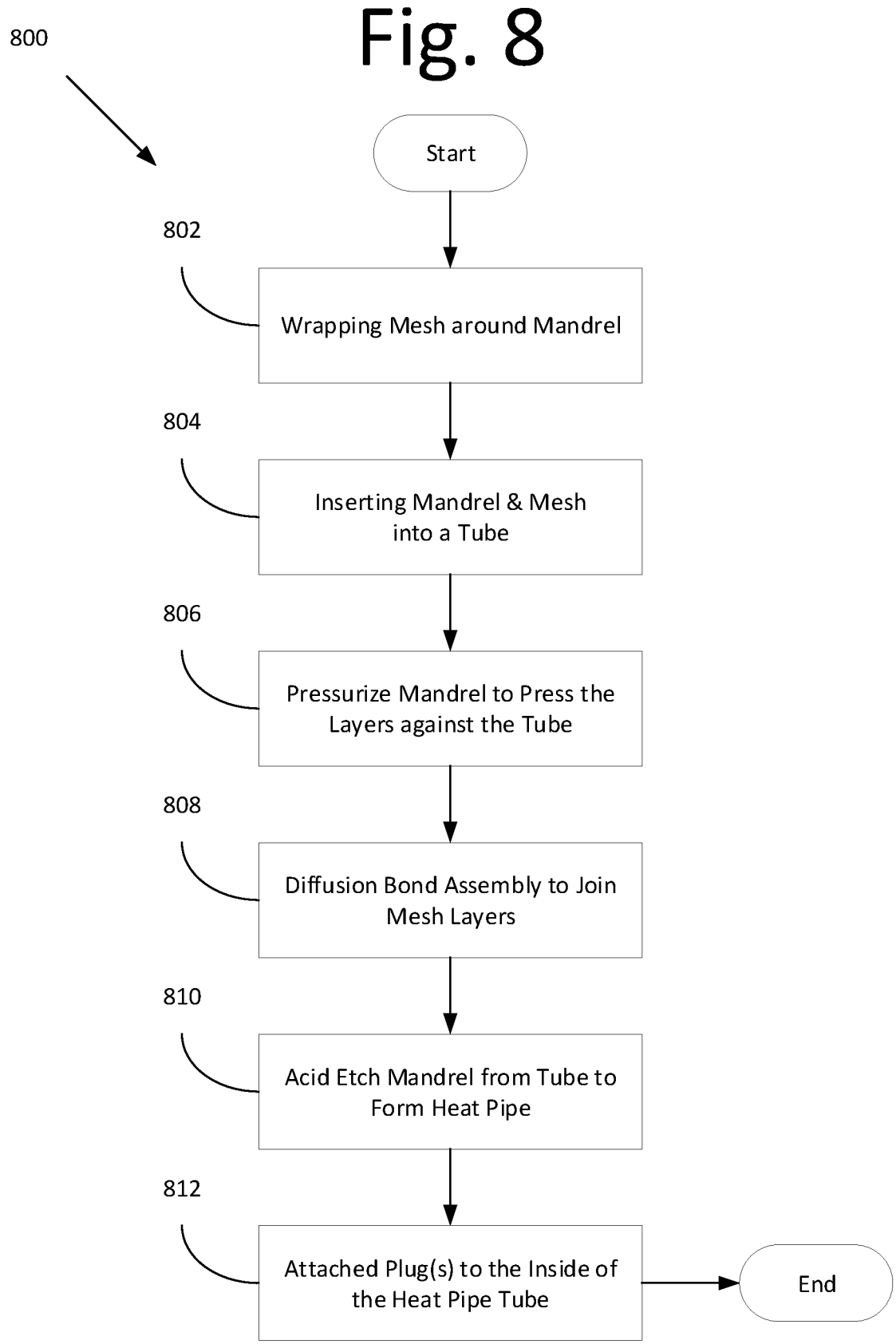

HEAT PIPE WICK FORMATION

CROSS-REFERENCE TO RELATED APPLICATION

This application is a continuation of U.S. patent application Ser. No. 17/216,398, filed Mar. 29, 2021, which claims the benefit of U.S. Provisional Patent Application No. 63/003,155 filed Mar. 31, 2020. The subject matter of these earlier-filed applications are hereby incorporated by reference in their entirety.

STATEMENT OF GOVERNMENT INTEREST

The United States government has rights in this invention pursuant to Contract No. 89233218CNA000001 between the United States Department of Energy and Triad National Security, LLC for the operation of Los Alamos National Laboratory.

FIELD

The present invention relates to heat pipes and, more particularly, to heat pipe wick formation.

BACKGROUND

Heat pipes serve in a range of applications such as electronics, spacecraft, and nuclear power conversion. This results from their flexibility in terms of size, heat transfer capability, and angle of operation. Fluid return to the hot zone through a high performance wick drives this versatility.

The shape of the heat pipe wick imposes order on a saturated liquid by (1) forming menisci between the condensate and the vapor and (2) allowing condensate to flow toward the heated zone. Simple heat pipe wicks are homogeneous with a uniform pore structure requiring condensate to flow axially through the same pore structure that forms the surface menisci. These menisci collectively produce a capillary pressure rise that is a driving potential enabling heat pipe operation.

In the heated zone of a heat pipe, evaporation of the liquid produces vapor. Vaporization increases pressure on the concave (vapor) side of the liquid meniscus that wets the wick. This pressure rise drives vapor toward the cooled zone and returns condensate to the heated zone through the wick. For a heat pipe to work correctly, the maximum capillary pressure rise, $\Delta p_{c,max}$, governed by largest pore in the heated zone, must be greater than the pressure drops in the liquid and vapor regions: $\Delta p_{c,max} \geq \Delta p_{p1} + p_v$. The pressure drop in heat pipe wicks, $\Delta_{p1}$, is typically viscous and so is linear with local mass flow rate. The effects of stable vaporization to the heated region combine with unstable condensation of vapor in the cooled region. Viscous and turbulent inertial effects (with possible pressure recovery) may contribute locally to the vapor zone pressure change, $\Delta p_v$. Compound wicks address the performance limitations of homogeneous wicks by providing a low resistance liquid flow path for condensate return not tied to the pore structure that forms the surface menisci. Two compound wick geometries are especially attractive for high power density liquid metal heat pipes: an annular gap and an artery wick.

FIG. 1a is a diagram illustrating a cross section of a homogeneous wick 100a. Homogeneous wick 100a produces a capillary pressure rise but has high resistance to condensate flow limiting the axial heat transfer rate.

FIGS. 1b and 1c are diagrams illustrating a cross sections of each of wicks 100b and 100c. The annular wick 100b allows condensate to freely flow toward the hot zone in a gap between the pipe inner surface and the outer surface of the porous material on which menisci form. Artery wicks 100c are similar to homogeneous wicks in that their outer diameter mates with the inner diameter of the heat pipe and inner diameter sits at the liquid-vapor boundary. Artery wicks 100c incorporate one or more non-concentric arteries that create channels for free condensate motion. To maintain capillary continuity, a solid plug seals compound wicks on the end nearest the heated zone. A compound wick normally remains open at the cold end to ease fill. As a heat pipe warms, its working fluid expands. When the heat pipe is isothermal, excess condensate (typically 5% of charge) seals the condenser end of the wick ensuring capillary continuity.

Wicks made from metals processed to minimize non-metallic impurities such as oxygen, nitrogen, carbon, silicon, and similar elements are essential for corrosion free, long lived operation of high temperature alkali metal heat pipes. The absence of such non-metallic impurities also promotes wetting of alkali metal to the metallic wick and heat pipe wall. High performance wicks also possess fine pores to maximize capillary pressure rise across the menisci. Finally, to further enhance heat pipe performance the wick itself should possess minimal cross sectional area to allow maximum cross sectional area availability to vapor and unconstrained liquid flow. Prior art may fall short in one or more of these areas. Thus, an alternative process for forming a heat pipe wicks is needed.

SUMMARY

Certain embodiments of the present invention may provide solutions to the problems and needs in the art that have not yet been fully identified, appreciated, or solved by current heat pipe formation technology. For example, some embodiments generally pertain to a forming a heat pipe wick.

In an embodiment, the method for forming a heat pipe wick in a controlled atmosphere includes wrapping a plurality of layers of a fine mesh screen around a mandrel to form a wick. The method also includes inserting the mandrel and the wick into a dissolvable sheath or non-dissolvable tube, and pressing the fine mesh screen between the sheath or tube and the mandrel to form an assembly. The pressing of the wick comprises applying pressure to the mandrel, the sheath or the tube. The method further includes diffusion bonding the assembly at a temperature sufficiently high achieving self-diffusion of the plurality of layers of the fine mesh screen, used to form the wick, to themselves. The method also includes cooling the diffusion bonded assembly to room temperature, and etching the mandrel and sheath from the diffusion bonded assembly, leaving the wick as a porous tube (as shown in FIG. 1a and FIG. 1c) or porous lined tube (as shown in FIG. 1b).

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1A is a diagram illustrating a cross section of a homogeneous wick formed by a common method according to an embodiment of the present invention.

FIG. 1B is a diagram illustrating a cross section of an annular wick formed by a common method according to an embodiment of the present invention.

FIG. 1C is a diagram illustrating a cross section of an artery wick formed by a common method according to an embodiment of the present invention.

FIG. 5 is a graph illustrating an effect of acid concentration upon copper and stainless steel etching rates at 25° C., according to an embodiment of the present invention.

FIG. 6 is a diagram illustrating an acid etching setup, according to an embodiment of the present invention.

FIG. 7 is a flow diagram illustrating a process for forming a porous tube that can be used as an annular heat pipe wick or as component in an artery heat pipe wick, according to an embodiment of the present invention.

FIG. 8 is a flow diagram illustrating a process for bonding a fine mesh wick to the interior of a heat pipe tube that can be used as a homogeneous heat pipe wick or as a component in an artery heat pipe wick, according to an embodiment of the present invention.

DETAILED DESCRIPTION OF THE EMBODIMENTS

Figure 2A:
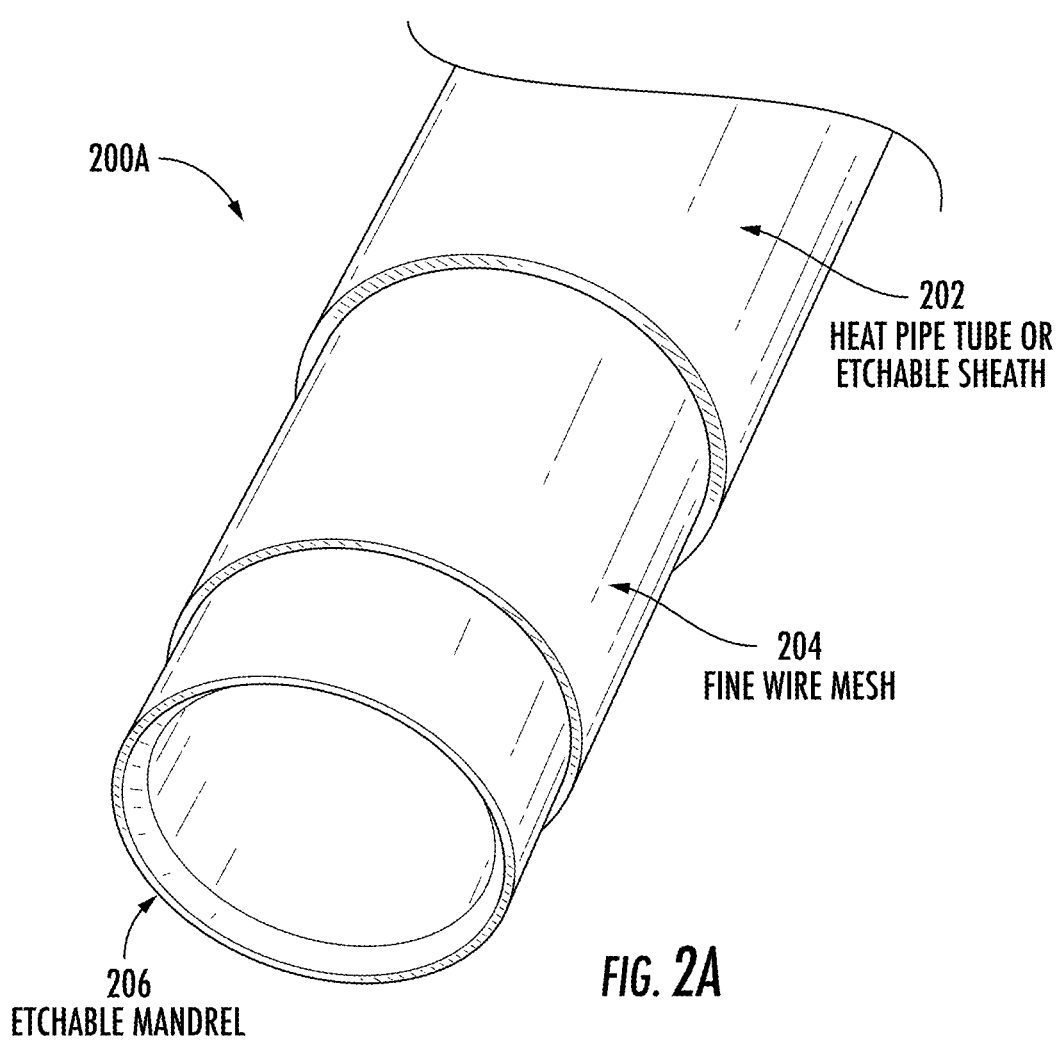
FIG. 2A is an image illustrating a fine mesh screen wrapped around an internal etchable mandrel as the mesh is being inserted into a heat pipe tube, according to an embodiment of the present invention.

One embodiment pertains to forming a porous lined heat pipe tube comprising a tube and fine wire screen from an etchable mandrel. This porous lined tube that can be used as a homogeneous heat pipe wick or as a component in an artery heat pipe wick.

Another embodiment pertains to forming a porous tube comprising a fine wire screen from an etchable mandrel and sheath. This porous tube can be used as an annular heat pipe wick or as component in an artery heat pipe wick.

Forming a Porous Tube

Wick forming includes procurement of raw goods for the wick assembly, all the way up to bubble point testing of the final product. Though there are many approaches for forming heat pipe wick, processes described below represent methods that achieve high power density operation. As an example, the following embodiments assume that the wick being formed is to be used in a ⅝ in. ID heat pipe.

Since procedures to produce the porous lined heat pipe tube closely match the procedures to produce the porous tube, the following discussion covers generic steps to achieve the respective end products.

Procurement

The first step to create a wick is to buy raw materials. Table 1 summarizes the wick material selected. Multiple layers are needed to provide both structure and necessary capillary action in the wick. Table 1 shows suggested sizing and 400×400 wires per inch fine mesh material (stainless steel screen) to produce an average effective pore radius of about 32 μm. In another embodiment still finer material such as an 1150×200 wires per inch filtration cloth may be used to produce an effective pore radius of about 32 μm. A sufficient quantity of wick material should be purchased to allow each wick to include multiple layers.

TABLE 1

| Wick Material Selection | | |
|---|---|---|
| Item Description | 400 × 400.001316, 316 Stainless Steel Standard Grade Woven Wire Cloth | |
| Vendor | Belleville Wire Cloth Co., Inc. | |
| Specifications | Mesh (per lineal inch) | 400 × 400 |
| | Wire Diameter | 0.0010 in. |
| | Width of Opening | 0.0015 in. |
| | Open Area | 36.00% |
| | UNS # | S31600 |
| | Chemical Composition | C - 0.08% |
| | | Cr - 16.0-18.0% |
| | | Mn - 2.0% |
| | | Mo - 2.00-3.00% |
| | | Ni - 10.00-14.00% |
| | | P - 0.045% |
| | | S - 0.03% |
| | | Si - 1.00% |
| | Standard Roll Widths | 36 in. |
| | | 48 in. |
| | | 60 in. |
| | Type of Weave | Plain |

Copper tubing may be purchased in two different sizes: one may serve as the inner mandrel and the other may serve as the external sheath (for the porous tube). For an assumed ⅝ in. ID heat pipe, standard 0.625 in. OD copper tubing with 0.049 in. wall thickness (0.527 in. ID), and 0.75 in. OD copper tubing with 0.049 in. wall thickness (0.652 in. ID), is used as the mandrel and sheath respectively. Table 2 summarizes tubing dimensions. The purchased standard copper tubing will later be drawn or swaged to size to provide appropriate sizing constraints during wick formation.

A sufficient quantity of all material is purchased so that samples for fabrication demonstration and purity measurements may be taken at various stages of wick construction to verify product quality. The use of nitrile gloves is recommended for material handling, particularly after chemical cleaning. This helps prevent the introduction of non-metallic impurities that can lead to heat pipe de-wetting and impurity induced corrosion. The embodiments are not limited to the materials listed above, other material may be included for formation of the wick.

Copper Tubing Processes

The next steps include the following two subsections, which describe the cleaning and drawing/swaging processes applied to the procured copper tubing in preparation for use in the final wick assembly.

Tube Cleaning

Once tubing outlined has been obtained, the tubing should be cleaned to remove surface impurities. At a minimum, the copper mandrel, and the copper sheath or stainless steel tube are degreased using CRC Heavy Duty Degreaser, for example. A rinse in methanol may follow this step.

Draw and Swage Tubing

The purchased standard tubing is drawn or swaged to size before use in the wick formation assembly. Resizing of the standard tubing provides the necessary inner and outer diameter structure for rolling the wick and drawing of the final assembly. Drawn copper tube sizes influence final wick dimensions and, ultimately, heat pipe operation as sizing of the wick and annular gap play a key role in heat pipe performance. Capillary action needed for heat pipe operation may not be achievable if the annular gap is too large, while insertion of the wick into the heat pipe may be difficult if the gap is too small. Difficulty of wick insertion increases with length. As the heat pipe becomes longer, there is a greater likelihood of straightness and diameter variations in both the heat pipe cavity and the wick.

TABLE 2

Mandrel and Sheath Sizing

| | Initial Outer Diameter [in] | Initial Inner Diameter [in] | Drawn Outer Diameter [in] | Drawn Inner Diameter [in] |
|---|---|---|---|---|
| Mandrel | 0.625 | 0.527 | 0.547 | 0.449 |
| Sheath | 0.750 | 0.652 | 0.703 | 0.605 |

Examples of initial copper tubing sizes as well as the final drawn size for both the mandrel and sheath are shown in Table 2. The table values assume the use of a seven-layer wick wrap and the wick will be used in a ⅝ in. ID heat pipe. Note that the provided example is one of numerous possible dimensional configurations. Actual dimensions are based on the performance requirements of the heat pipe.

From Table 2 above, it should be noted that the drawn sheath dimensions include an additional 0.015 in. radial gap to allow for easier insertion of the rolled wick. Actual gap size may vary, depending how straight and tight the resulting wick is after rolling.

Cleaning Copper Tubing

Contaminants may be introduced to copper tubing surfaces during the drawing process, and therefore, the copper tubing is cleaned again. At a minimum, it is recommended that degreasing of the exterior copper tube surfaces be conducted using CRC Heavy Duty Degreaser followed by a methanol rinse, since this will be the final processing step for the copper tubing prior to use in the wick assembly.

Stainless Steel Screen Processes

Some embodiments described below pertain to the process for readying stainless steel screen for assembly of the final mesh formation assembly. Steps may include cutting wick material to size, chemical cleaning, vacuum firing, and rolling of the wick. In an effort to mitigate additional contamination, use nitrile gloves for material handling, particularly after cleaning and firing.

Cut Stainless Steel Down to Size

In some embodiments, the previously procured screen is cut to size for use in the final forming assembly. The length of stainless steel screen cut is of a sufficient quantity to wrap the copper mandrel a minimum seven times. The actual number of layers used depends on the heat-pipe design.

Chemically Clean Stainless Steel Screen

In some embodiments, the previously procured screen is cut to size for use in the final forming assembly. The length of stainless steel screen cut is of a sufficient quantity to wrap the copper mandrel a minimum seven times. The actual number of layers used depends on the heat-pipe design.

The cleaning procedure is described below. First, containers (PVC) for cleaning components are selected. Next, Citranox solution is mixed as needed at a concentration of 15 ml of Citranox liter of distilled water. After that, the mixed Citranox solution is sonicated for a total of 40 to 60 minutes. Fourth, 2 to 4 liters of caustic cleaner are made with the following composition for 2 liters of solution:
  a. 1860 ml $H_2O$
  b. 170 g NaOH
  c. 500 ml bottle 30% $H_2O_2$ (512 ml calculated)

Thereafter, components are placed in a PVC container and are sonicated for 40 to 60 min. It should be noted that agitation may provide greater access to the internal screen surfaces. It should be further appreciated that the volution of oxygen forms a noxious aerosol of sodium hydroxide particulates that should not be inhaled, and therefore, this step should be performed in a hood. After that, the components are rinsed with hot tap water, and the last two previously mentioned steps are repeated at least two or three times. The contents of the PVC container are then replaced with deionized water and sonicate, and also replaced with 100% ethanol (denatured with volatile components like methanol) and sonicate for 5 min. The contents are then dried and moved to a vacuum for degassing, which is described in more detail below.

Vacuum Fire Stainless Steel Screen

After chemical cleaning, the stainless steel screen is also vacuum fired to degas and remove non-metallic impurities. The process for vacuum firing the stainless steel screen is as follows. First, the wick material is placed in a clean vacuum furnace. Next, vacuum pumps are turned on. Thereafter, once a pressure of <$10^{-6}$ torr is reached, the system is gradually heated until a temperature 50° C. above the expected maximum heat pipe operating temperature is achieved. It should be noted that the pressure should not exceed $10^{-5}$ torr at any point during vacuum firing. After this, the wick material is vacuum fired for two hours. Once completed, the furnace system heat is shut off and the wick is allowed to cool under high vacuum conditions (<$10^{-6}$ torr). The vacuum chamber is then shut down when the wick is cool. Finally, the wick material is inspected as needed by pulling a section of the wick material out of the furnace using a grabber that has been wiped down with methanol.

Roll Wick

After chemically cleaning and vacuum firing the stainless steel screen, the wick is ready to be rolled. Commonly used wick rolling methods use the copper mandrel as a tool for wrapping the wick. One technique for securing the mandrel during wick rolling operations is by making use of mounted pillow blocks on each end of the mandrel. Pillow blocks allow for easy rotation of the mandrel and constraint of the assembly.

During rolling, it is critical that the wick material is kept taut to mitigate significant gaps and variances in pore and wick size. Wick uniformity is desired, as it reduces the likelihood of creating pores that are too large for optimal heat pipe operation. For the example provided in this document, an average pore radius of 32 μm is desired. After rolling, spot welds secure the ends of the rolled stainless steel screen. The final product should have at least seven layers of wick material to obtain a desired average pore radius of 32 μm, with a maximum pore radius no greater than 50 μm. Additionally, wick straightness should be of less than 0.01 in/ft.

Wick Assembly Procedure

This section described the steps taken after completion of the assembly to form a completed wick. Before the following procedures, the previously rolled wick and mandrel assembly are inserted into the copper sheath. The wick assembly is now complete and ready for further processing.

FIG. 2A is an image 200A illustrating heat pipe tube 202, fine mesh screen 204, and etchable mandrel 206, according to an embodiment of the present invention. In this embodiment, a fine wire mesh 204 is wrapped around an internal etchable mandrel 206 as mesh 204 is being inserted into heat pipe tube 202. In another embodiment, 202 may be an etchable sheath. Note the procedural equivalence of the insertion of fine wire mesh 204 and etchable mandrel 206 into non-etchable heat pipe tube 202 with the insertion of fine wire mesh 204 and etchable mandrel 206 into the etchable sheath. Use of a length of wire wrapped around fine wire mesh 204 and mandrel 206, pulled from non-etchable tube or etchable mandrel once insertion is complete, can ease insertion of the fine wire mesh and etchable mandrel into the etchable sheath or heat pipe tube.

Wick Assembly Deformation

In some embodiments, pressure is applied to the mandrel and sheath assembly to obtain an appropriate diffusion bond between wick layers. The wick assembly must be deformed such that the wick material is sandwiched firmly between the copper sheath and mandrel.

Figure 2B:
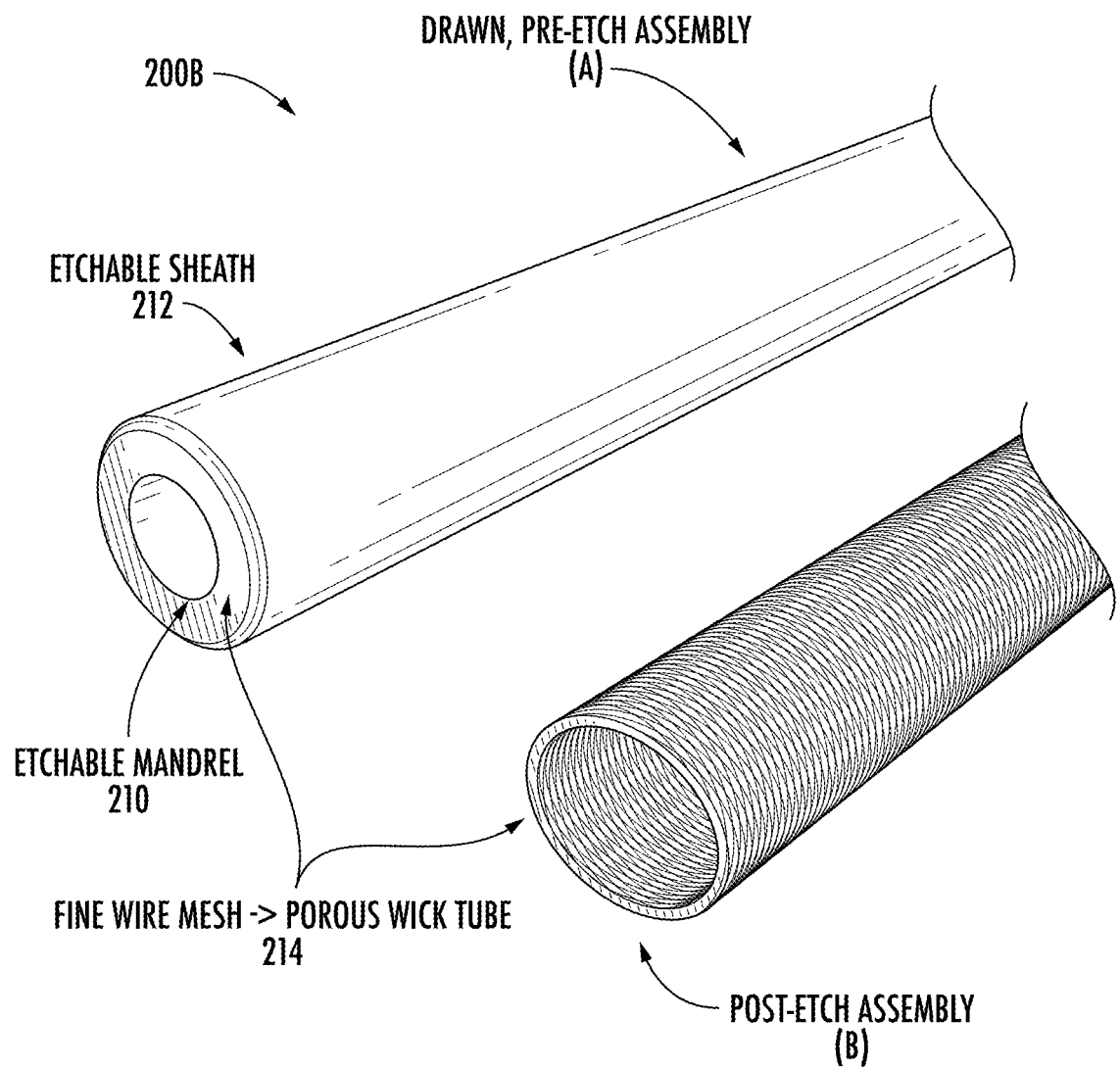
FIG. 2B is an image illustrating a fine mesh screen wrapped around an internal etchable mandrel after being pressed into an external etchable sheath, according to an embodiment of the present invention.

One way to deform the wick assembly is by drawing or swaging the sheath, against the fine mesh screen and mandrel assembly. Drawing causes the sheath to decrease in diameter, while mandrel and wick diameters remain largely unchanged. The result is a compressed stainless steel wick, firmly pressed between the copper sheath and mandrel. For the provided example, the assembly should be drawn to have approximate inner and outer diameters of 0.449 in. and 0.673 in., respectively. FIG. 2B is an image 200B illustrating a fine wire mesh 214 wrapped around an internal etchable mandrel 210 after etchable sheath 212 has been drawn, compressing fine wire mesh 214 together.

Figure 2C:
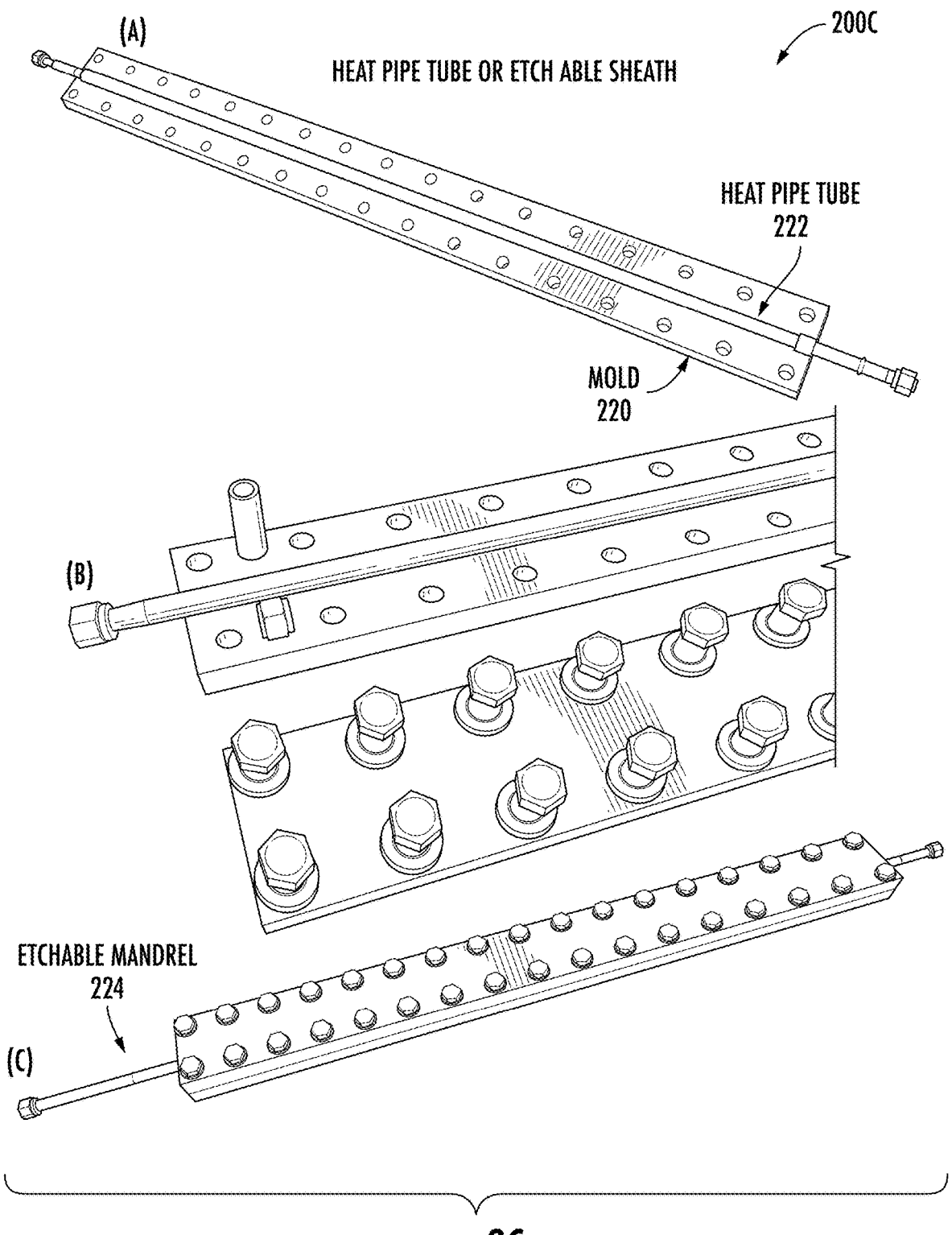
FIG. 2C is an image illustrating a mesh wrapped around an internal etchable mandrel inserted into a heat pipe tube with the heat pipe tube placed into a supporting mold, according to an embodiment of the present invention.

Another way to deform the wick assembly is by internally pressurizing the etchable mandrel with hydraulic fluid (oil or water) to press the mandrel and sheath against the heat pipe tube. A mold may be used to constrain the heat pipe tube during pressurization. FIG. 2C are images 200C (a)-(c) illustrating fine mesh screen (cannot be seen in the drawing) wrapped around an internal etchable mandrel 224 inserted into a heat pipe tube 222 with heat pipe tube 222 placed into a supporting mold 220, according to an embodiment of the present invention. In some embodiments, mold 220 constrains expansion of heat pipe tube 222 when hydraulic fluid is applied inside etchable mandrel 224.

In general, it may be beneficial to reduce the sheath diameter rather than to increase the diameter of the mandrel and wick. Expanding the mandrel diameter may permanently deform the stainless steel screen resulting in pore sizes that are outside the bounds of acceptability for heat pipe operation.

Diffusion Bond Wick Assembly

Once drawn, the wick assembly is diffusion bonded to allow layers of screen to diffuse together and prevent unraveling of the porous structure after etching. The diffusion bonding procedure is similar to that used for vacuum firing, as described earlier. However, the primary differences between the two processes are the temperature and duration of operation. Temperature and time necessary for diffusion bonding can be found by first determining the diffusivity at a given temperature using the Arrhenius equation shown below.

$$D = D_0 e^{\frac{-Q}{RT}} \quad \text{Equation (1)}$$

In the above equation, $D_0$, Q, and R are constants representing frequency factor, activation energy, and the ideal gas constant respectively. Variable T is the diffusion temperature. Earlier disclosures provide an estimated $D_0$ of $5.8 \times 10^{-5}$ m$^2$/s and Q of 280328 J/mol for stainless steel.

Fick's second law can then be used to determine the time necessary to obtain an atom fraction, $N_A$, at a desired penetration distance, x, from the diffusion interface. Diffusion of wick layers is critical in this step. The desired diffusion penetration should be based upon screen thickness and the amount of penetration needed to firmly join wick layers such that separation will not occur after etching.

The following equation represents Fick's second law, assuming a condition in which diffusivity is constant or nearly constant throughout the diffusion process. Diffusivity may be considered nearly constant for wick bonding since the diffusion process is conducted under nearly isothermal conditions.

$$N_A = N_{A_1} + \frac{N_{A_2} - N_{A_2}}{2}\left[1 + \text{erf}\left(\frac{x}{2\sqrt{Dt}}\right)\right] \quad \text{Equation (2)}$$

The above equation can be rearranged to solve for t, the time necessary for element 1 to diffuse a distance x into element 2. $N_{A1}$ and $N_{A2}$ represent the initial atom fractions of element 1 and element 2. Assuming element 1 and element 2 have entirely different compositions; $N_{A1}$ and $N_{A2}$ are taken to be 1 and 0 respectively. This assumption provides a clear numerical indication of what the atom fraction of element 1 is in element 2 at a given distance. $N_A$ values range between 0, where element 1 is not present at all (no penetration of element 1 into element 2) and 1 where only element 1 is present (no penetration of element 2 into element 1). For example, $N_A$ is equal to 0.5 at the diffusion interface since element 1 and element 2 are equally represented.

Steps outlined in the earlier section can be used to diffusion bond the wick assembly, with furnace temperature and firing duration indicated in Steps 3 and 4 being replaced by the combination of these values determined using the above equations.

A typical value for time temperature of a diffusion bonded stainless steel wick is 3 hours at 900° C.

Etch Copper Mandrel from Wick

After diffusion bonding the wick assembly, the copper material is etched away, leaving only the stainless steel wick behind. The copper material undergoes the active dissolution while the stainless steel has low dissolution because of a stable oxide layer in nitric acid.

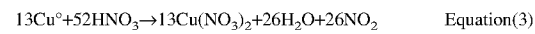

$$13Cu°+52HNO_3 \rightarrow 13Cu(NO_3)_2+26H_2O+26NO_2 \quad \text{Equation(3)}$$

The above equation provided describes the dissolution of copper at a high concentration of Nitric Acid. The products of this reaction are a green solution of copper and a significant amount of brown nitrogen oxide vapor so this process should be performed in a fume hood.

Figure 3:
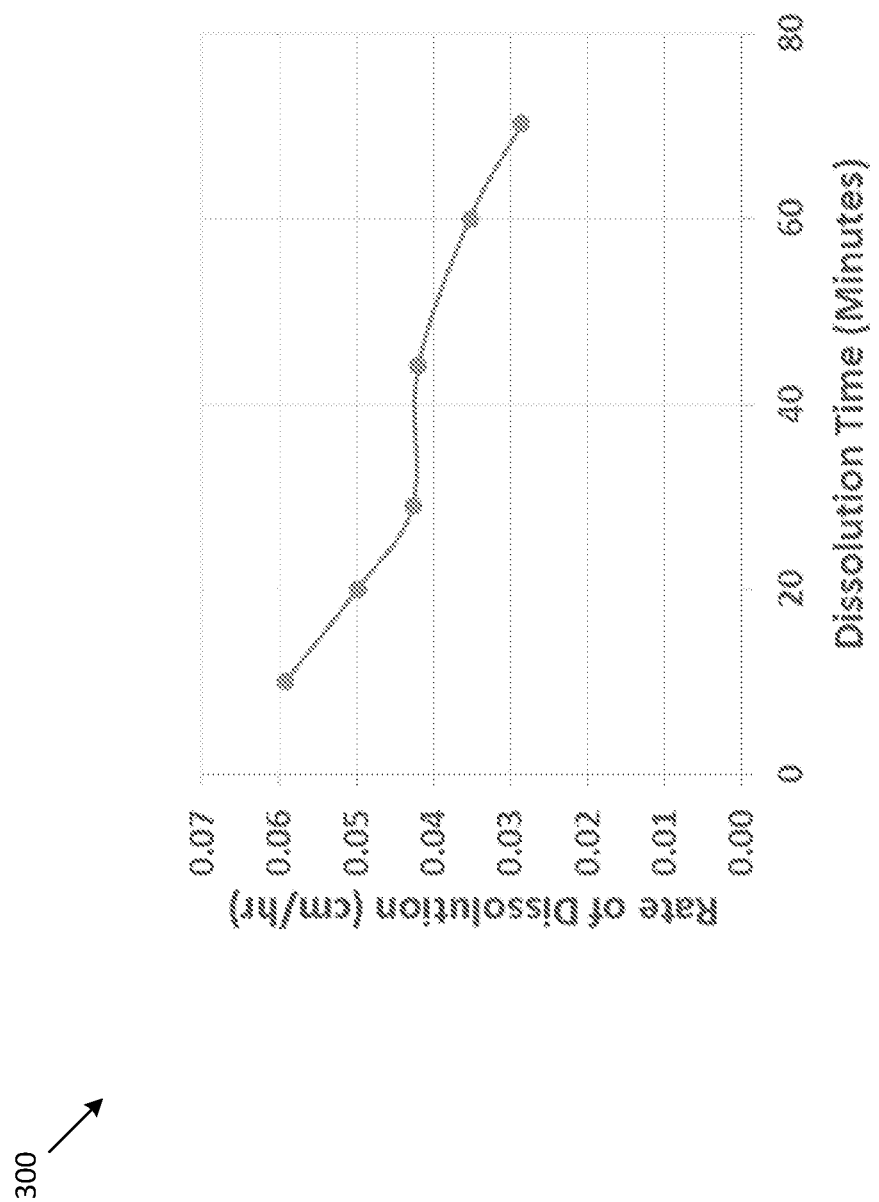
FIG. 3 is a graph illustrating a rate of copper dissolution versus total run time for 4 M $HNO_3$ at 60° C., according to an embodiment of the present invention.

As the dissolution reaction shown in the equation above proceeds the approximately 72% of the nitric acid is consumed. As the acid is consumed the rate of reaction decreases. This relation is shown in FIG. 3 below, which is a graph 300 illustrating Rate of copper dissolution versus total run time for 4 M HNO₃ at 60° C., according to an embodiment of the present invention.

Figure 4:
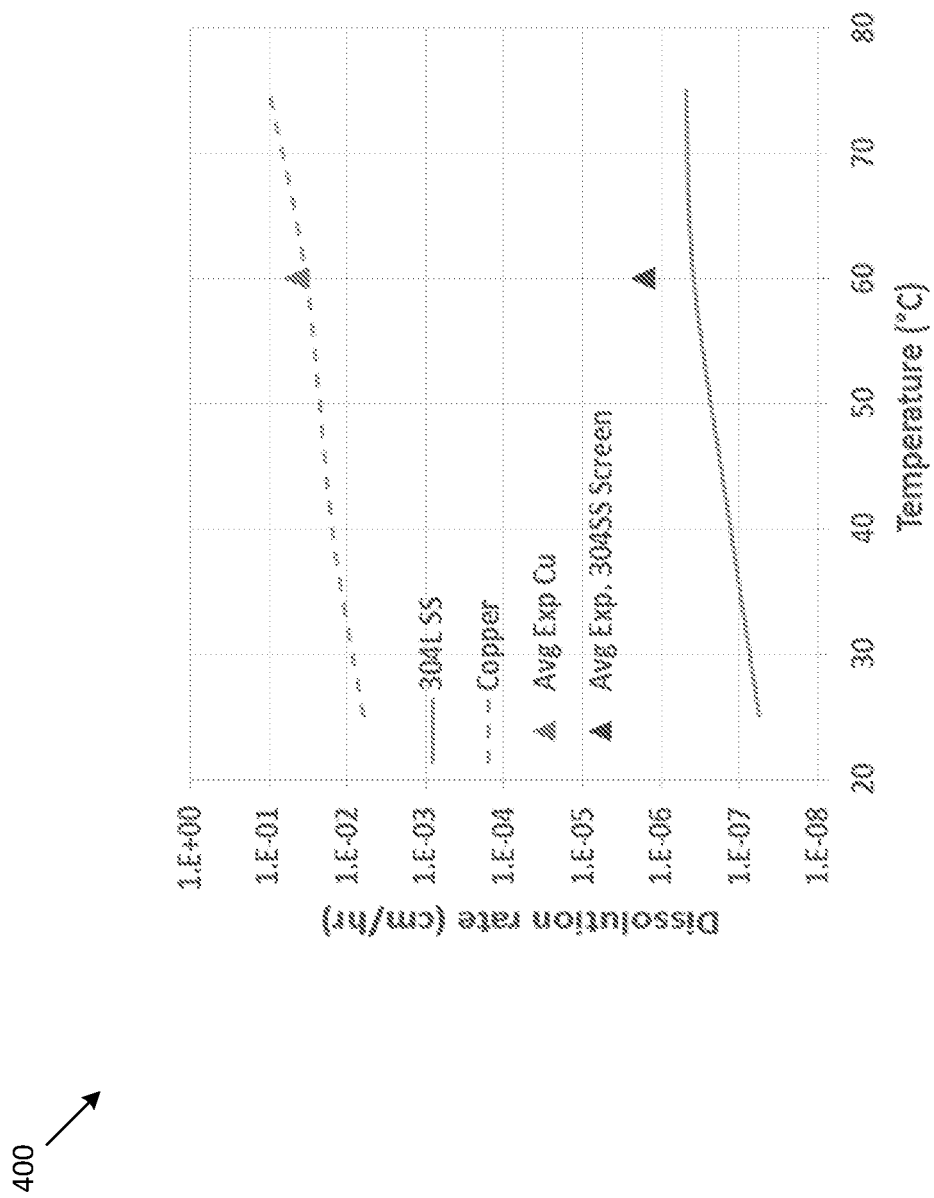
FIG. 4 is a graph illustrating a predicted dissolution rates compared with the average experimental dissolution rates, according to an embodiment of the present invention.

Previous studies evaluated the effect of temperature and nitric acid concentration on dissolution rates of both copper and stainless steel to identify preferred etching conditions. For example, the previous studies showed that dissolution of copper and stainless steel increases at approximately the same rate with temperatures ranging from 25° C. to 60° C. Between temperatures of 60° C. and 75° C., the dissolution of stainless steel seems to plateau and reach a constant rate. Due to negligible differences in stainless steel dissolution rate between 60° C. and 75° C. and difficulties associated with heating and maintaining solution temperature, 60° C. was chosen as a suitable etching temperature. See, for example, FIG. 4, which is a graph 400 illustrating the predicted dissolution rates compared with the average experimental dissolution rates, according to an embodiment of the present invention.

Nitric acid concentration were examined to identify the preferred conditions for etching. FIG. 5 is a graph 500 illustrating an effect of acid concentration upon copper and stainless steel etching rates at 25° C., according to an embodiment of the present invention. For example, graph 500 shows dissolution rates of copper and stainless steel for nitric acid concentrations ranging from 1M to 8M. Increasing the concentration of nitric acid from 1M (6 wt. %) to 4M (22 wt. %) increases the rate of reaction by 50%. Dissolution of copper remains relatively constant over the entire considered range (1M to 8M); however, the dissolution of stainless steel increases by about a factor of 10 between 1M and 4M. Above a concentration of 4M, the stainless steel dissolution rate remains nearly constant.

Based on observed trends, a concentration of 4M is recommended for bulk dissolution of the copper sheath and mandrel. Subsequent dissolution of the wick and any residual copper material is recommended to have a concentration of 2M. A higher initial nitric acid concentration reduces the amount of time required to remove the majority of the outer copper material. Subsequent dissolution makes use of a lower concentration to continue removal of copper material while also keeping dissolution of the wick itself to a minimum. See FIG. 2B, which is an image 200B illustrating a comparison of the wick assembly before and after etching, according to an embodiment of the present invention. Essentially, FIG. 2B shows a view of pre-etched assembly (a) and post-etch assembly (b) after hot acid etching. For purposes of explanation, post-etch assembly (b) is the finished porous tube, which may be an annular wick or artery.

One potential setup for acid etching of the wick assembly 600 is shown in FIG. 6. In FIG. 6, a PVC trough or pipe 605 is filled with a sufficient amount of nitric acid to submerge the wick assembly. Hydrogen is produced during etching, so a ventilator is needed and operations should be conducted in a fume hood. Once filled, an in-line heater 610 is used to heat the acid to the desired etching temperature. Recommended acid concentrations and temperature are discussed earlier in this section.

A peristaltic pump 615 then circulates the heated nitric acid through the system loop. Pumping helps maintain fluid temperatures and replenishes acid in the trough in order to sustain consistent etching rates throughout the process. Depending on how long the etching process takes, acid may also need to be replaced to maintain etching rates.

All materials (e.g. tubing, peristaltic pump tubing, and PVC cement) must be checked for compatibility with nitric acid prior to conducting etching operations.

Bubble Point Test Wick

After etching, all that remains of the wick assembly is the stainless steel mesh itself Analyze the surface of the wick to ensure the wicks surface is free of copper contamination. The newly formed wick must then be bubble point tested to determine whether the pore sizing is adequately small for heat pipe operation. The bubble point test determines the approximate size, general pore size distribution, and location of the largest pore.

First, obtain and setup a PVC trough for bubble point testing. The trough should be appropriately sized, such that the wick may be completely submerged. Next, the wick is placed into the trough. After that, argon gas system is connected such that pressure applied through the inside of the wick is also easily measured (e.g., by way of a manometer).

Thereafter, argon gas source is connected to one end of the wick, by inserting the tube wick adapter into the wick. One way of doing this, is by using Swagelok and pipe fittings. The band on the adapter may serve as a seal for pressurizing the wick on the gas source end. Then, rubber stopper is inserted into the opposite end of the wick to allow pressurization. Thereafter, the trough is filled with methanol such that the wick is fully submerged. Further, spring clamps and L-blocks or other means are used to hold the wick in place, being careful not to deform the wick.

Note, if the quantity of methanol needed for this operation is in excess of that allowed by facility, safety, or other restrictions, deionized water may be used as an alternative. Because water has a slower evaporation rate at room temperature, the dry out process following test will differ significantly.

Then, the valve is opened to the argon gas source and the pressure inside the wick is gradually increased until bubbling is observed. Next, the pressure and location of the bubble site are recorded. Then, the pressure and document bubble sites continue to increase until the cutoff pressure is reached. The cutoff pressure is generally the pressure that corresponds to the mean pore size of the wick material. The maximum pore radius can be estimated using the recorded pressure reading and the following relationship.

$$P = \frac{4\gamma\cos\theta}{2R} \qquad \text{Equation (4)}$$

It should be noted that the wick should have an average pore radius of approximately 32 µm, with pores being no larger than 50 µm. Once the cutoff pressure has been reached and all necessary data recording has been completed, the pressure inside the wick is reduced to approximately 0.1 psig. Then, methanol (or deionized water) is removed from the trough. Nickel or stainless steel foil adjacent to the trough is laid out for placement of the wick. In certain embodiments, the foil is approximately 1-ft wide and is long enough to cover the entire length of the wick. The wick is carefully removed from the trough and placed on the foil, ensuring that the wick is not wrinkled or bent during the process. The pressure inside the heat pipe is reduced to atmospheric pressure and shut off the argon source. Also, the adapter and rubber stopper are carefully removed from the ends of the heat pipe. If deionized water was used, the entire length of the wick is doused with methanol to help dry the remaining water, which may be trapped in the wick. If methanol was used, lint free wipes are used to absorb methanol (or deionized water) that the wick expels onto foil, making sure not to touch the wipe directly to the wick.

If deionized water was used, the wick is dried and repeated. If methanol was used, the wick is dried and placed into a vacuum furnace for vacuum firing. The wick is baked to remove any residual methanol (or deionized water) by following the vacuum firing procedure discussed above. It should be noted that the furnace temperature should be increased to approximately 150° C. and firing should last for approximately 3 hours. Also, note that the vacuum conditions are maintained until the wick cools completely.

Wick Plug

After verifying wick pore size using bubble testing, a wick plug is installed on one end of the wick. Specifically, wick plugs are installed at the evaporator end of the wick to maintain capillary continuity. The following subsections detail wick plug preparation and installation processes.

Machine Wick Plug

In certain embodiments, a wick plug is machined for installation onto one or more ends of each wick. Wick plug designs taper to allow for insertion into the heated end of the wick.

Chemically Clean Wick Plug

As with all previously discussed assembly components, the wick plug is also cleaned before use. The chemical process used for wick plug cleaning is identical to the previously described process for cleaning the stainless steel screen.

Vacuum Fire Wick Plug

The wick plug should also be vacuum fired for degassing prior to installation onto the wick. As before, firing temperature should be at least 50° C. above the expected heat pipe operating temperature and vacuum conditions should never exceed $10^{-5}$ torr.

Bond Wick to Wick Plug

After cleaning, the wick plug is ready to be bonded to the newly formed wick. Various methods may be used for bonding, as long as the presence of oxygen is minimized. Oxidized components can lead to the creation of ternary corrosion compounds among the oxygen wall material and sodium working fluid, resulting in reduced heat pipe operational efficiency and potential failure.

One way to bond the two components together is tungsten inert gas (TIG) welding, described in the procedure below. For example, the wick plug may be welded, in this embodiment, to the wick. Other embodiments include brazing or diffusion—bonding of the wick plug to the wick.

There may be a few ways to perform diffusion bonding. One method to diffusion bond the wick plug to the wick is to place a tight fitting ring around the wick made from a material that has a lower thermal expansion coefficient than the wick plug. In this embodiment, the porous tube and the plug are heated in a controlled temperature and atmosphere expanding the porous tube and the plug relative to the tight fitted ring. This creates a pressure and temperature sufficient to bond the porous tube and the plug. Finally, after cooling the bonded the porous tube and plug, the ring is removed from the bonded porous tube and the plug.

Another method for diffusion-bonding includes wrapping wires around the wick at a location above the wick plug. Thereafter the wires are tightened by crimping. The wires may have a thermal expansion coefficient less than the wick plug.

FIG. 7 is a flow diagram illustrating a process 700 for forming an annular heat pipe wick in a controlled atmosphere, according to an embodiment of the present invention. In some embodiments, the controlled atmosphere is an inert gas or a vacuum.

Process 700 may begin at 702 with wrapping of a plurality of layers of a fine mesh screen around a mandrel to form a wick. Fine mesh screen may be defined as a screen that has a square, twill or dutch weave, or a filtration cloth. At 704, inserting (or sliding) the etchable mandrel and metal mesh into an etchable sheath. In some embodiments, the mandrel and/or sheath may be composed of copper material, mild steel, or commercial purity titanium. Also, in certain embodiments, the mandrel and/or the sheath are etchable in an acid without affecting the wick.

At 706, swage or draw the assembly, compressing the layers of mesh together between the sheath and mandrel to form an assembly. Note, that the assembly comprises the wick, the mandrel, and the sheath. In some embodiments, the compression is performed by applying pressure to the exterior of the sheath and mandrel. Pressure may be applied by using a rotary swage or draw the assembly using a draw die.

At 708, the assembly is diffusion bonded at a predefined temperature to join the layers of mesh together to form a porous tube. The predefined temperature is sufficient to achieve self-diffusion of the plurality of layers of the fine mesh screen used to form the porous tube. At 710, acid etch the mandrel and sheath from the diffusion bonded assembly, leaving a wick as a porous tube to be used as an annular wick or artery.

It should be appreciated that steps 702-710 are performed inside of a chamber. Once the diffusion bonded assembly is cooled to room temperature, at 712, plugs are attached to the porous tube by diffusion bonding techniques to form a wick. The etchant in some embodiments should attack the mandrel and sheath and not the wick itself. For stainless, copper may be preferred. For molybdenum, mild steel may be preferred. For niobium, titanium may be preferred. Depending on the embodiment, the following acids may be used—nitric, hydrochloric, sulfuric, or oleic.

The porous tube may be rigid and may be inserted into a heat pipe to serve as a capillary structure to circulate working fluid during operation of the heat pipe. In certain embodiments, before the wick (i.e., the porous tube) is inserted into the heat pipe, at 714, a plug is attached to one or both ends of the wick.

FIG. 8 is a flow diagram illustrating a process 900 for bonding two components together, according to an embodiment of the present invention.

Process 800 may begin at 802 with wrapping of a plurality of fine mesh layers of wire screen around a mandrel. Mandrel may be an etchable mandrel in some embodiments. At 804, inserting the mandrel and mesh into a tube. In some embodiments, the mandrel may be composed of copper material, mild steel, or commercial purity titanium. Also, in certain embodiments, the mandrel is etchable in an acid without affecting the tube.

At 806, pressurizing the mandrel to press the meshed layers against the inside surface of the tube. In some embodiments, the pressurizing of the mandrel is performed with a hydraulic pump using a hydraulic fluid such as an oil or water-based fluid.

At 808, the assembly is diffusion bonded at a predefined temperature to join the mesh layers. The predefined temperature is sufficient to achieve self-diffusion of the plurality of mesh to form the tube (e.g., a porous lined tube). At 810, acid etching the mandrel from the tube to form the heat pipe. Once the diffusion bonded assembly is cooled to room temperature, at 812, plugs are attached to the inside of the heat pipe tube using diffusion bonding techniques.

Bubble Point Test Wick-Wick Plug Assembly

After bonding the wick plug to the wick, a bubble point test is performed again on the assembly. This step qualifies the wick plug attachment, as the wick will only be pressurized if the previously performed weld is intact. Note that because the plug has been installed, rubber stoppers are no longer needed to pressurize the wick.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A method for forming a porous lined heat pipe, the method comprising:

inserting a wick assembly into an interior of a heat pipe tube, wherein the interior is defined by an internal diameter of the heat pipe tube and wherein the wick assembly comprises a plurality of fine mesh screen layers wrapped around a mandrel;

compressing the plurality of fine mesh screen layers of the wick assembly between the mandrel and the internal diameter of the heat pipe tube;

diffusion bonding the plurality of fine mesh screen layers such that the fine mesh screen layers achieve self-diffusion and an exterior surface of the wick assembly is bonded to the interior of the heat pipe tube, thereby forming a diffusion bonded assembly;

etching the mandrel from the diffusion bonded assembly, thereby forming the porous lined heat pipe; and inserting a porous wick tube into an internal cavity of the porous lined heat pipe, thereby forming an artery heat pipe wick.

2. The method of claim 1, wherein etching the mandrel from the diffusion bonded assembly comprises:

submerging the diffusion bonded assembly in acid;

heating the acid to an etching temperature; and circulating the heated acid, thereby dissolving the mandrel.

3. The method of claim 2, wherein the plurality of fine mesh screen layers comprises stainless steel, wherein the mandrel comprises copper, and wherein the acid comprises nitric acid.

4. The method of claim 1, wherein the plurality of fine mesh screen layers comprises at least seven fine mesh screen layers.

5. The method of claim 1, wherein the plurality of fine mesh screen layers comprises fine mesh screens layers with differing degrees of fineness.

6. The method of claim 1, wherein the wick assembly comprises an average pore radius of at least 32 μm and a maximum pore radius less than 50 μm.

7. The method of claim 1, further comprising forming the porous wick tube, wherein forming the porous wick tube comprises:

wrapping a second plurality of fine mesh screen layers around a second mandrel, thereby forming a second wick assembly;

inserting the second wick assembly into a sheath;

compressing the second plurality of fine mesh screen layers of the second wick assembly between the mandrel and sheath;

diffusion bonding the second plurality of fine mesh screen layers, thereby forming a second diffusion bonded assembly; and etching the second mandrel and the sheath from the second diffusion bonded assembly, thereby forming the porous wick tube.

8. The method of claim 7, wherein compressing the second plurality of fine mesh screen layers of the second wick assembly comprises applying pressure to an exterior of the sheath.

9. The method of claim 8, wherein applying pressure to the exterior of the sheath comprises using a rotary swage.

10. The method of claim 8, wherein applying pressure to the exterior of the sheath comprises using a draw die.

11. The method of claim 7, wherein compressing the second plurality of fine mesh screen layers of the second wick assembly comprises applying pressure to an interior of the mandrel.

12. The method of claim 11, wherein applying pressure to the interior of the mandrel comprises pressurizing the mandrel with a hydraulic pump using a hydraulic fluid.

13. The method of claim 7, wherein the method further comprises:
attaching a wick plug to at least one end of the porous wick tube.

14. The method of claim 13, wherein attaching the wick plug to the at least one end of the porous wick tube comprises:
placing a tight fitting ring around the porous wick tube, wherein the ring is made from a material having a lower thermal expansion coefficient than the wick plug;
heating the porous wick tube and the wick plug such that the porous wick tube and the wick plug expand relative to the ring, thereby bonding the porous wick tube and the wick plug;
cooling the bonded porous wick tube and wick plug; and
removing the ring from the bonded the bonded porous wick tube and wick plug.

15. The method of claim 13, wherein attaching the wick plug to the at least one end of the porous wick tube comprises:
wrapping one or more wires around the porous wick tube at a location above the wick plug, wherein the one or more wires have a thermal expansion coefficient less than the wick plug; and
crimping the one or more wires, thereby tightening the one or more wires.

16. The method of claim 7, wherein diffusion bonding the second plurality of fine mesh screen layers comprises heating the heat pipe tube and the wick assembly for at least three hours and at a temperature of at least 900° C.

17. The method of claim 1, wherein the method further comprises:
attaching a wick plug to at least one end of the porous lined heat pipe.

18. A method for forming a porous lined heat pipe, the method comprising:
wrapping a length of wire around a wick assembly prior to insertion of the wick assembly into an interior of a heat pipe tube, wherein the wick assembly comprises a plurality of fine mesh screen layers wrapped around a mandrel;
inserting the wick assembly into the interior of the heat pipe tube, wherein the interior is defined by an internal diameter of the heat pipe tube;
pulling and removing the length of wire from the wick assembly at completion of insertion of the wick assembly into the interior of the heat pipe tube;
compressing the plurality of fine mesh screen layers of the wick assembly between the mandrel and the internal diameter of the heat pipe tube;
diffusion bonding the plurality of fine mesh screen layers such that the fine mesh screen layers achieve self-diffusion and an exterior surface of the wick assembly is bonded to the interior of the heat pipe tube, thereby forming a diffusion bonded assembly; and
etching the mandrel from the diffusion bonded assembly, thereby forming the porous lined heat pipe.

19. A method for forming a porous lined heat pipe, the method comprising:
inserting a wick assembly into an interior of a heat pipe tube, wherein the interior is defined by an internal diameter of the heat pipe tube and wherein the wick assembly comprises a plurality of fine mesh screen layers wrapped around a mandrel;
compressing the plurality of fine mesh screen layers of the wick assembly between the mandrel and the internal diameter of the heat pipe tube, wherein compressing the plurality of fine mesh screen layers of the wick assembly between the mandrel and the internal diameter of the heat pipe tube comprises:
inserting the heat pipe tube with the wick assembly into a supporting mold; and
internally pressurizing the mandrel with hydraulic fluid;
diffusion bonding the plurality of fine mesh screen layers such that the fine mesh screen layers achieve self-diffusion and an exterior surface of the wick assembly is bonded to the interior of the heat pipe tube, thereby forming a diffusion bonded assembly; and
etching the mandrel from the diffusion bonded assembly, thereby forming the porous lined heat pipe.

* * * * *

UNITED STATES PATENT AND TRADEMARK OFFICE
CERTIFICATE OF CORRECTION

| | | |
|---|---|---|
| PATENT NO. | : 12,339,068 B1 | Page 1 of 1 |
| APPLICATION NO. | : 18/654487 | |
| DATED | : June 24, 2025 | |
| INVENTOR(S) | : Robert Stowers Reid et al. | |

It is certified that error appears in the above-identified patent and that said Letters Patent is hereby corrected as shown below:

In the Claims

In Column 15, Line 19, Claim 14, delete "the bonded the bonded" and insert -- the bonded --, therefor.

Signed and Sealed this
Second Day of December, 2025

John A. Squires
*Director of the United States Patent and Trademark Office*